Patented Nov. 17, 1931

1,832,328

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

RUBBER VULCANIZATION ACCELERATOR AND PROCESS FOR PREPARING SAME

No Drawing. Original application filed August 29, 1928, Serial No. 302,890. Divided and this application filed October 18, 1928. Serial No. 313,376.

This invention relates to a method for the preparation of the reaction product of a carbon disulfid derivative of a primary or secondary aliphatic amine with a nitro or a nitro and halogen substituted derivative of a phenyl halogen mercaptan. The manufacture of the preferred class of compounds will be readily understood from the following description and examples of a preferred mode of carrying out the invention.

The amine salts of alkyl-dithiocarbamic acids, as are well known, are produced by the action of carbon disulfid on primary or secondary aliphatic amines and are accelerators of the rubber vulcanization process. It has now been found that such amine salts or alkali salts of alkyl-dithiocarbamic acids can be combined with a nitro substituted phenyl halogen mercaptan to produce a stable compound having the general formula

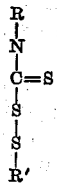

wherein R represents aliphatic hydrocarbon groups and R' represents a nitro substituted aryl group. Such compounds have been found to be active as accelerators of vulcanization when employed in a rubber mix and produce rubber products in a short period of time that possess high tensile strengths and other desirable characteristics required in commercial practice.

The compounds of the type comprising the subject-matter of the present invention are preferably manufactured according to the following example. Thus, one of the preferred type of compounds, the reaction product of piperidine pentamethylene dithiocarbamate and o-nitro-phenyl chlormercaptan, was prepared by dissolving substantially two molar portions of piperidine (170 parts) in ethyl alcohol. To this alcoholic solution of piperidine, approximately one molar portion of carbon disulfid (76 parts) was added slowly at room temperature. To the alcoholic solution of piperidine penta-methylene dithiocarbamate thus prepared, substantially one molar portion (190 parts) of o-nitrophenyl chlormercaptan was added with agitation and while maintaining a temperature of approximately 20 to 50° C. After the materials had been combined in the manner described, agitation was continued for about three hours at a temperature of substantially 20 to 50° C. The yellow solid formed, comprising the desired material, was filtered off, washed with alcohol and dried at a temperature of about 50° C. This material, which is soluble in alcohol, benzene and chloroform, possesses a melting point of substantially 123.8 to 124.3° C. and is most probably formed according to the following equation:

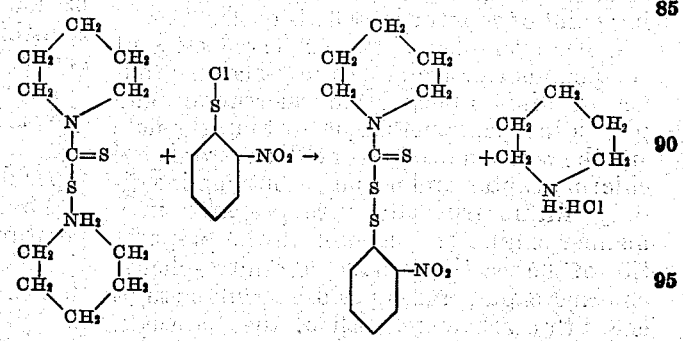

As another method of preparing the above compound, in place of the piperidine salt of pentamethylene dithiocarbamic acid, the sodium salt of pentamethylene dithiocarbamic acid was reacted with o-nitro-phenyl chlormercaptan according to the following procedure.

Approximately one molar portion of sodium hydroxide (40 parts) was dissolved in about 1200 parts of ethyl alcohol. Approximately one molar portion of piperidine (85 parts) was added thereto and then substantially one molar portion of carbon disulfid (76 parts) was added at room temperature. To the sodium salt of pentamethylene dithiocarbamic acid thus formed, approximately one molar portion of o-nitro-phenyl chlormercaptan (190 parts) was added at about 50° C. After the addition of the o-nitrophenyl chlormercaptan was completed, the reaction mixture was stirred for an additional period of about four hours at approximately 50° C. The reaction product was then filtered off, washed with water to eliminate the sodium chloride formed as a by-product, and dried at about 50° C. If prepared according to this method, the formation of the desired material most probably takes place according to the following equation:

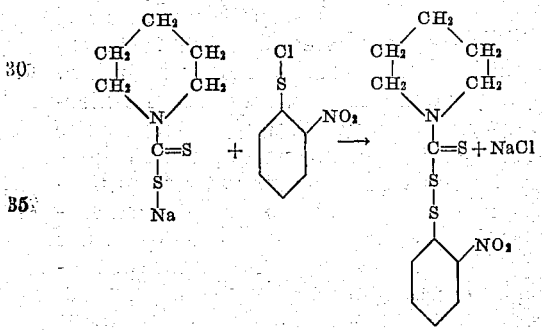

Another of the preferred class of compounds, for example the reaction product of o-nitro-phenyl chlormercaptan and diethylamine, diethyl dithiocarbamate, was prepared in an analogous manner to the reaction product of o-nitro-phenyl chlormercaptan and piperidine pentamethylene dithiocarbamate hereinbefore mentioned. The material so obtained was a yellow solid, soluble in alcohol and chloroform, and possesses a melting point of substantially 90.1 to 92.2° C.

Other examples of the preferred class of compounds, for example the reaction product of dinitro-phenyl chlormercaptan and piperidine pentamethylene dithiocarbamate and the reaction product of chlor-nitrophenyl chlormercaptan and normal dibutylamine dibutyl dithiocarbamate were prepared in a manner similar to that used in the preparation of the reaction product of o-nitro-phenyl chlormercaptan and piperidine pentamethylene dithiocarbamate. All of the materials, the preparation of which is described in this specification, on testing were found to be valuable vulcanization accelerators.

Having thus described these examples of the invention, I do not wish to be understood as being limited to the exact proportions, ingredients, temperatures and steps set forth, for various changes may be made without departing from the essential features of my invention. The invention is limited solely by the claims attached hereto as a part of this specification wherein it is intended to claim the invention as broadly as possible.

This case is a division of application Serial No. 302,890, filed August 29, 1928, by the present applicant.

What is claimed is:

1. A process of preparing a rubber vulcanization accelerator which comprises reacting a di-thio-carbamate with a nitro substituted phenyl halogen mercaptan.

2. A process of preparing a rubber vulcanization accelerator which comprises reacting a di-thio-carbamate with a nitro substituted phenyl chlormercaptan.

3. A process of preparing a rubber vulcanization accelerator, which comprises reacting a di-thio-carbamate with o-nitro-phenyl chlormercaptan.

4. A process of preparing a rubber vulcanization accelerator, which comprises reacting a salt of a substituted dithiocarbamic acid with o-nitro-phenyl chlormercaptan.

5. A process of preparing a rubber vulcanization accelerator which comprises reacting an amine salt of a substituted dithiocarbamic acid with o-nitro-phenyl chlormercaptan.

6. A process of preparing a rubber vulcanization accelerator which comprises reacting an amine salt of an alkyl substituted dithiocarbamic acid with o-nitro-phenyl chlormercaptan.

7. A process of preparing a rubber vulcanization accelerator which comprises reacting piperidine pentamethylene dithiocarbamate with o-nitro-phenyl chlormercaptan.

8. A process of preparing a rubber vulcanization accelerator which comprises reacting substantially equi-molar portions of piperidine pentamethylene dithiocarbamate and o-nitro-phenyl chlormercaptan.

9. A process of preparing a rubber vulcanization accelerator which comprises reacting a di-thio-carbamate with a nitro substituted aryl halogen mercaptan.

10. A process of preparing a rubber vulcanization accelerator which comprises reacting substantially equi-molar portions of piperidine pentamethylene dithiocarbamate and o-nitro-phenyl chlormercaptan at a temperature below 50° C.

11. The product formed by reacting a di-thio-carbamate with a nitro substituted phenyl halogen mercaptan.

12. The product formed by reacting a di-thio-carbamate with o-nitro-phenyl chlormercaptan.

13. The product formed by reacting substantially equi-molar portions of piperidine pentamethylene dithiocarbamate and o-nitro-phenyl chlormercaptan.

14. As a new product the material formed by reacting piperidine pentamethylene dithiocarbamate and o-nitro-phenyl chlormercaptan, which is a solid melting at substantially between 123 to 125° C., and is soluble in alcohol, benzene and chloroform.

15. The product formed by reacting a dithio-carbamate with a nitro substituted phenyl chlormercaptan.

In testimony whereof I hereunto affix my signature.

WINFIELD SCOTT.

DISCLAIMER 1,832,328.—*Winfield Scott*, Nitro, W. Va. RUBBER VULCANIZATION ACCELERATOR AND PROCESS FOR PREPARING SAME. Patent dated November 17, 1931. Disclaimer filed September 17, 1935, by the assignee, *The Rubber Service Laboratories Co.*

Hereby disclaim that part of the claim in said specification which is in the following words, to wit:

"1. A process of preparing a rubber vulcanization accelerator which comprises reacting a di-thio-carbamate with a nitro substituted phenyl halogen mercaptan."

"9. A process of preparing a rubber vulcanization accelerator which comprises reacting a di-thio-carbamate with a nitro substituted aryl halogen mercaptan."

"11. The product formed by reacting a di-thio-carbamate with a nitro substituted phenyl halogen mercaptan."

[*Official Gazette October 15, 1935.*]